March 13, 1934.                J. V. MARTIN                1,950,736
                            FREEWHEELING DEVICE
                    Original Filed April 17, 1929    2 Sheets-Sheet 1
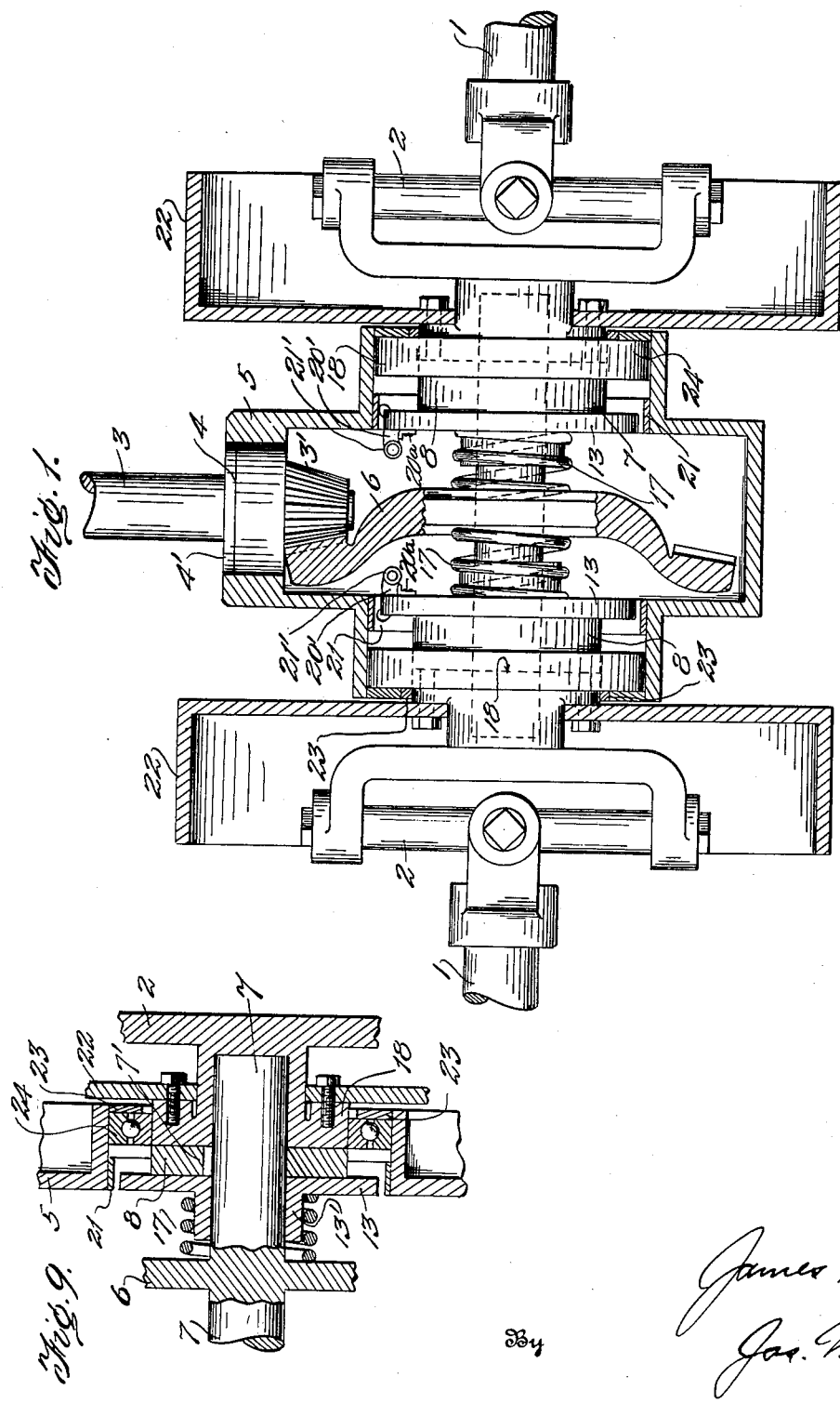

March 13, 1934.  J. V. MARTIN  1,950,736
FREEWHEELING DEVICE
Original Filed April 17, 1929  2 Sheets-Sheet 2
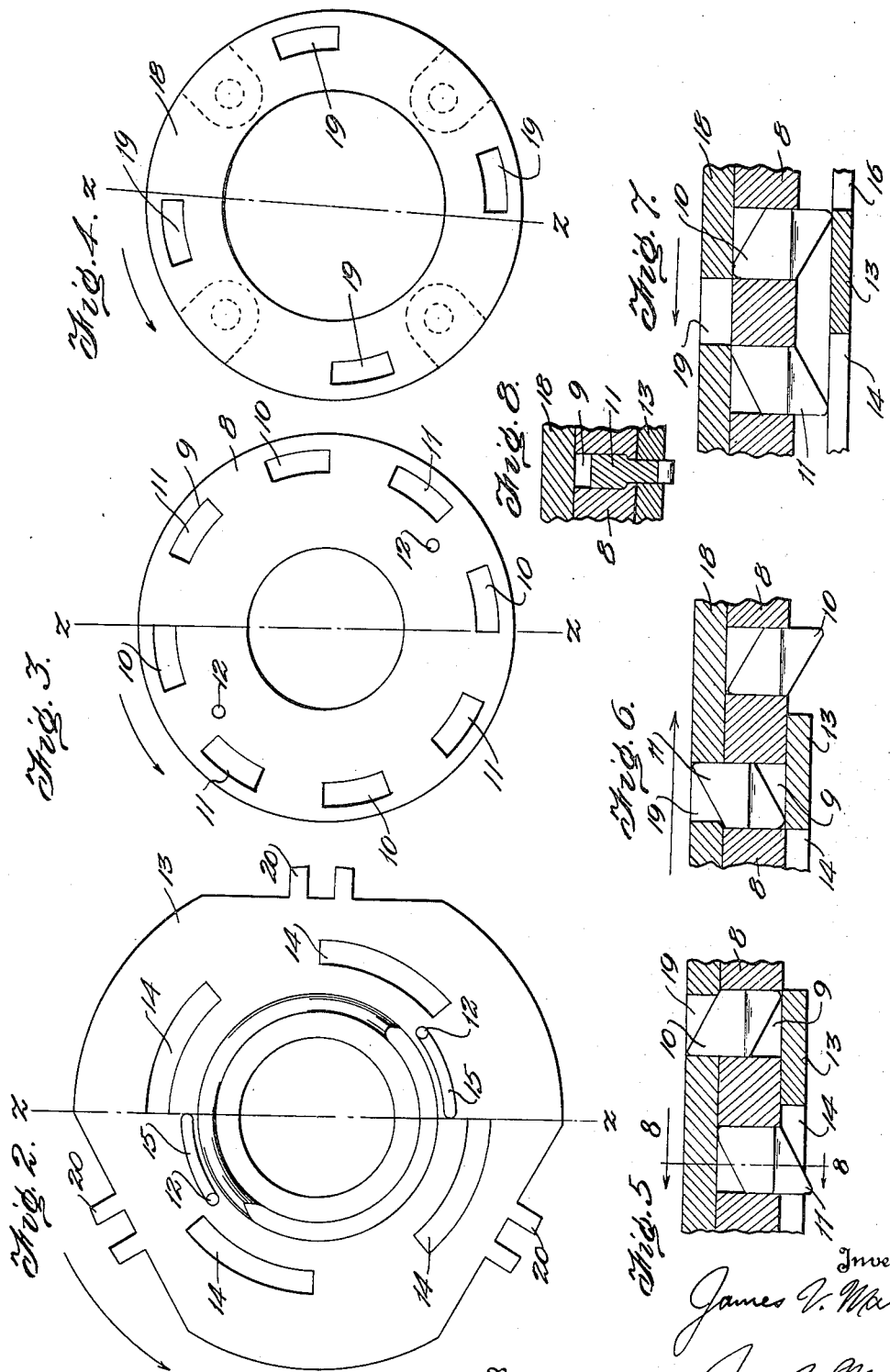

Patented Mar. 13, 1934

1,950,736

UNITED STATES PATENT OFFICE 1,950,736

FREEWHEELING DEVICE

James V. Martin, Garden City, N. Y.

Original application April 17, 1929, Serial No. 355,839. Divided and this application April 6, 1931, Serial No. 528,227

9 Claims. (Cl. 74—7)

My invention relates to improved forms of vehicle drive, particularly adapted to road, rail and aeroplane vehicles.

The primary object of my invention is to simplify the so-called differential usually found in the rear drive housing of automobiles and to correct certain faults of the conventional differentials while affording, in my substituted device, the advantages known to be obtained by so-called free wheeling devices.

This is a division of my pending application, Serial No. 355,839, filed Apr. 17, 1929. The invention consists in the novel combinations disclosed in the drawings and accompanying text and more particularly defined in the sub-joined claims.

Fig. 1 is a plan view of my rear end drive which replaces the conventional differential, while Figs. 2, 3 and 4 are respectively the tooth engager wheel, the driving tooth wheel and the driven tooth wheel of the rear end drive and Figs. 5, 6 and 7 show in section the principle of operation of the sliding teeth which engage the said wheels in different positions of operation, while Fig. 8 is a section taken along the line 8—8 of Fig. 5. Fig. 9 is a view mostly in section of the rear drive parts shown in Fig. 1.

Proceeding, now, with the detailed description of my invention, the numerals used will be understood to designate similar parts throughout the several views. 1 denotes the axle drive shaft, leading as shown in the parent case from the universal joints 2 through the hollow stub axle of the road wheel to a universal located on the sub-cap side of the said road wheel. The rear drive housing 5 incloses and supports a rear drive mechanism within an oil tight chamber; a shaft 3 from the motor and transmission entering the said housing through a ball bearing 4. The rear drive housing in the parent case is rigidly attached to the lower body portion and drives through universal joints to the road wheels, but my present invention can be used to replace the differentials found in conventional unsprung rear drive housings, in which case the universals can be omitted. Most of the time an automobile proceeds along a straight road without turning and during this time the usual differential mechanism has no good function, but is has several detrimental functions, adding weight and complication to the vehicle while depriving it of proper traction.

This is most noticeable in attempting to climb a slippery hill or to make progress in deep snow or sand, if one wheel has good ground under it the differential makes such good traction useless by delivering all the motor power to the wheel which has little or no traction. Also when the vehicle is making high speed and one wheel after the other alternatively leaves the ground, due to stored momentum and the inequalities of the road, the differential speeds up the free wheel and slows down the wheel which should be driving, this action not only loses power, but wears out tires and, of the conventional automobile, it may be truthfully said that it has a one wheel drive upon the worst of the two wheels. In addition to remedying the above and other faults my invention greatly facilitates gear shifting, eliminates the chief cause of carbonizing within the cylinders of the motor and saves much gasoline through automatic coasting, which is popularly known as "free wheeling".

4' is a dust packing ring through which shaft 3 drives the small bevel 3' which in turn drives the crown wheel 6, this crown wheel is rigidly connected with a pilot shaft 7 indicated in Fig. 1 by dotted lines. Rigidly keyed to shaft 7 at 7' is the driving tooth wheel 8 containing slots or apertures 9 into which are fitted alternately four forwardly driving teeth 10 and four rearwardly driving teeth 11; this wheel 8 also carries two pins 12 which extend into curved slots 15 in the engager wheel 13, which is journalled to turn on a sleeve bearing about the shaft 7.

This wheel 13 carries a braking or lagging device 20' held in lips 20. Normally, or when the rear wheels are stopped or going very slowly the small spring 20a keeps one end of the said brake 20' against an internally placed brake band 21, but when the wheel 13 rotates at speed the weights 21' take the brake away from contact with the band 21, since the brakes are journalled to turn within the lips or lugs 20.

The centrifugal force in the weights will overcome the spring action of spring 20a. A third or driven tooth wheel 18 is also provided with a sleeve bearing on the pilot shaft 7 and is drivingly connected at all times with a road wheel for the vehicle. Brake drums 22 are also secured to the driven wheel 18 and thus positioned they transmit the brake torque to the auto parts other than the rear drive mechanism. This driven wheel 18 rotates within a ball bearing 24 held against dirt by oil packing ring 23, and, with its like bearing on the other side of the housing, supports the entire drive mechanism for fast rotation. A spring 17 keeps the engager wheel 13 pressed firmly against the drive tooth wheel 8.

For details of operation please consult diagrammatic Figs. 5, 6, 7 and 8.

Starting with the car at rest, the drive shaft 3 from the motor drives the crown wheel 6 through the reduction bevel 3' and this in turn drives shaft 7 and the drive wheel 8 keyed thereto, but the engager wheel 13 lags due to the brake 20' until the pins 12 in wheel 8 come to the ends of slots 15 after which wheel 13 will turn with wheel 8 until the direction of rotation is reversed. In reading Figs. 2, 3, 4, 5, and 6, we can consider that we are looking from the crown wheel toward the wheels 13, 8 and 18 on the right hand side of the drive or the top of Fig. 1 with respect to its position on the page.

It will be seen that the lag of 13 will bring it into the position shown in Fig. 5, where it presses the forwardly driving teeth 10 into the driving slots 19 of wheel 18 and thus a forward drive for the road wheel is effected which is positive for both wheels, but because of the shape of each tooth and the less than tooth size of slots 19, it will be seen that the road wheel can over-run freely by pressing the engager wheel 13 against the spring 17 as shown in Fig. 7. There will be no pressure against the rearwardly driving teeth 11 because they stand in the slot 14 position of wheel 13. Thus if the automobile makes a left turn the right driving wheel can overrun to provide the needed differential action and when the motor is throttled the momentum of the car will cause it to coast, in which case both wheels will over-run, which is free wheeling.

To reverse, the reverse transmission lever will cause the motor shaft 3 to drive the crown wheel 6 in the opposite direction, but the lag in wheel 13 will cause the teeth 11 to replace teeth 10 in slots 19 of wheel 18, and Fig. 6 shows the resulting rearward driving position of wheels and teeth. The teeth are carefully radiused as well as tapered and also shaped so they cannot fall out of the slots of wheel 8, see Fig. 8 for this detail. Naturally when in rearward driving position the teeth 11 can be forced out of slots 19 against the spring 17 for overrunning or free wheeling, but there will be a two wheel positive drive on both wheels rearwardly as there was in the forwardly driving arrangement and this complete reversal is effected by no added mechanism, but only by reversing the direction of rotation of the power shaft 3.

Having thus described my invention and the method of its operation, what I particularly claim is:

1. In an automobile a reduction drive mechanism for two of the road wheels of the said automobile, including three cooperating discs for differential action located on both sides of the said reduction mechanism and providing free wheeling for both the said wheels.

2. In combination with a free wheeling device for automobile road wheels and arranged on both sides of a crown wheel, a tooth carrying member, a tooth driven member and a rotating member, not rigid with said crown wheel, controlling the position of the said tooth in the said tooth carrying member.

3. In combination with a differential drive from an automobile to two of the road wheels of the said automobile, rotative differential parts, on both sides of a crown wheel, held in rotative alignment by a pilot shaft about which they are free to rotate, antifriction bearings carrying the said rotative parts and the said pilot shaft, a brake drum attached to one of the said parts outside of the said bearings and a universal joint located adjacent each of the said bearings and also within the said brake drum.

4. In combination with a differential drive from within a centrally located oil tight housing to two automobile road wheels, a reduction gear and a set of three discs located on each side thereof, each set provided with slots and teeth in the central discs for movement in the said slots, said movement controlled by the discs on either side of the said central discs.

5. In combination with the housed differential drive to two automobile road wheels tapered sliding teeth held within a rotative disc between two other discs, one of the said other discs driven by said teeth and permitting the overrunning of a road wheel drivingly attached thereto, the remaining disc controlling the position of the said teeth in the first said disc.

6. A housed differential drive to two automobile road wheels, including three rotary members located on each side of a crown wheel, the central one of each set of said members being rigidly connected to rotate with the said crown wheel and the other two members journalled to move independently of, but about the same axis as the said crown wheel, one of the said members being driven by said central member and the other regulating the driving connection therewith.

7. In an automobile drive to two of its road wheels, means of driving the two said wheels positively forward and the said means permitting either or both said wheels to over-run and a friction means of reversing the driving connection of the said means and a speed governor means of releasing said friction means.

8. In combination within the sprung rear drive housing between two automobile road wheels, speed reduction means, a shaft carrying part of said means and forming the journalled bearing for two separate free wheeling devices, one such device located on each side of the said part and loose tapered teeth forming a sliding reciprocal driving connection between the last said means and the said devices.

9. In combination with the drive to a vehicle wheel, a driving rotative part carrying slidable teeth engageable to drive an adjacent driven part and a tooth regulating part on the opposite side of the first said part, the said teeth including alternate sets of forwardly and rearwardly, one way, driving means.

JAMES V. MARTIN.